United States Patent
Belrose et al.

(10) Patent No.: US 8,775,812 B2
(45) Date of Patent: Jul. 8, 2014

(54) RECEIVED MESSAGE VERIFICATION

(75) Inventors: Caroline Belrose, Marlborough (GB); Nicholas Bone, Thatcham (GB); Timothy Wright, Reading (GB)

(73) Assignee: Vodafone Group PLC, Newbury, Berkshire (GB)

( * ) Notice: Subject to any disclaimer, the term of this patent is extended or adjusted under 35 U.S.C. 154(b) by 404 days.

(21) Appl. No.: 12/667,783

(22) PCT Filed: Jul. 7, 2008

(86) PCT No.: PCT/GB2008/050540
§ 371 (c)(1),
(2), (4) Date: Jun. 18, 2010

(87) PCT Pub. No.: WO2009/004388
PCT Pub. Date: Jan. 8, 2009

(65) Prior Publication Data
US 2010/0275027 A1   Oct. 28, 2010

(30) Foreign Application Priority Data
Jul. 5, 2007   (GB) .................................. 0713012.3

(51) Int. Cl.
*H04L 29/06*   (2006.01)

(52) U.S. Cl.
USPC ........................................ 713/176

(58) Field of Classification Search
USPC .................. 713/176; 726/2; 380/247, 270
See application file for complete search history.

(56) References Cited

U.S. PATENT DOCUMENTS

| | | | |
|---|---|---|---|
| 7,142,891 B2 * | 11/2006 | Shankar et al. ............. | 455/566 |
| 7,500,098 B2 | 3/2009 | Paatero | |
| 2003/0014663 A1 * | 1/2003 | Sormunen et al. ............ | 713/200 |
| 2004/0146163 A1 * | 7/2004 | Asokan et al. ................ | 380/277 |
| 2007/0260866 A1 * | 11/2007 | Wang et al. ........................ | 713/2 |
| 2008/0005577 A1 * | 1/2008 | Rager et al. .................... | 713/183 |
| 2008/0107269 A1 | 5/2008 | Gehrmann et al. | |

FOREIGN PATENT DOCUMENTS

| | | | |
|---|---|---|---|
| EP | 1659810 | * | 2/2006 |
| GB | 2335568 | | 9/1999 |
| WO | WO-98/57511 | | 12/1998 |

OTHER PUBLICATIONS

International Search Report for PCT/GB2008/050540.
Search Report Dated Dec. 22, 2007 in Application No. GB0713012.3.
European Search Report dated Dec. 20, 2012 in Application No. 08 776 175.5.

* cited by examiner

*Primary Examiner* — Ali Abyaneh
(74) *Attorney, Agent, or Firm* — B. Aaron Schulman, Esq.; Nicholas Trenkle, Esq.; Stites & Harbison, PLLC.

(57) ABSTRACT

A method of verifying the validity of a message received by a telecommunications terminal (8) having a processor (30) and which is operable in a boot mode and a runtime mode is disclosed. In the embodiments the message is a SIM unlock message, for removing or modifying a restriction of the types of subscriber identity module (SIM) with which the mobile terminal may be used. In response to reception of the SIM unlock message when the terminal (1) is in the runtime mode, the processor 30 of the terminal (1) causes the terminal to enter the boot mode and verify the validity of the message during the boot mode. Because the validity of the message is checked during the boot mode, the check can be performed with greater security.

15 Claims, 17 Drawing Sheets

RECEIVED MESSAGE VERIFICATION

The present invention relates to a method of verifying the validity of a message received by a telecommunications terminal. The invention also relates to a message verification system and a telecommunications terminal. The message may be, for example, a subscriber identity module (SIM) unlock message sent to the telecommunications terminal.

Mobile or cellular telecommunications terminals, such as those operating in accordance with the GSM or UMTS Standards, operate in association with a SIM provided by the telecommunications network with which the mobile telecommunications terminal has a subscription. Typically, this functional association is provided by inserting the SIM in an appropriate SIM reader in the mobile terminal. As is well known, and as will be briefly be described below, the SIM includes data that allows the mobile telecommunications terminal to authenticate itself with the network and to receive telecommunications services from the network.

Mobile terminals are often configured prior to shipping to an end user to only operate fully when a particular type of SIM is functionally associated with the mobile terminal. This procedure is referred to as "SIM locking". For example, the mobile terminal may be configured to only operate fully with particular (authorised) SIMs—for example, SIMs issued by or under control of telecommunications networks providing services in only a particular country or countries; SIMs provided by or under control of a particular network (such as Vodafone®); or only one particular SIM. Any other SIMs are considered to be unauthorised for use with the mobile terminal.

A mobile terminal may be configured to provide some services when no SIM is functionally associated with it or when an unauthorised SIM is associated with it. For example, the mobile terminal may allow emergency calls to be made to the police, ambulance or fire service using a known emergency telephone number.

If an unauthorised SIM is inserted in a SIM locked mobile terminal, typically mobile terminals are configured to display a message, requesting that the user enters a SIM unlock code, or may simply display a message indicating that the mobile terminal is locked, or a prompt to insert a correct, i.e. authorised, SIM.

In some countries, such as the United Kingdom, it is a requirement for a network provider to allow a mobile terminal to have the SIM locking restriction removed in certain circumstances. In order to meet this requirement, mobile terminals are currently supplied with a SIM unlocking application which is executable by the processor of the mobile terminal. The SIM unlocking application is configured to remove or modify the restriction on the mobile terminal as to with which SIMs the mobile terminal will be fully operational when provided with a special message, known as a SIM unlock code (typically a 10-20 digit code).

SIM unlock codes may be derived from a mobile terminal's IMEI or MCC codes using a mathematical formula. The IMEI and MCC codes are known to both the mobile terminal and the network operators that ship the mobile terminal. A SIM unlock code derived from the IMEI or MCC can be generated using the mathematical formula by the network and then entered on the mobile terminal (for example, by manual keying-in or by over the air transmission). If the entered SIM unlock code matches the expected SIM unlock code pre-stored on the mobile terminal during its manufacture (or by the network prior to shipping or the entered SIM unlock code can be validated in some way by the unlocking application), then the SIM lock application performs the necessary modifications to the mobile terminal to remove or modify the restrictions on the type of SIMs with which the mobile terminal will operate fully.

More recently, SIM unlock codes have been generated completely randomly. The SIM unlock code for each mobile terminal is stored securely on the mobile terminal for access by the SIM unlock application, and is also stored securely by the network. Therefore, the network is able to provide such a SIM unlock code to the mobile terminal when this is appropriate.

It has been known for unauthorised third parties to provide SIM unlock codes to users of mobile terminals independently of the network provider. This is possible if the SIM unlock code is based on the IMEI or MCC code of a mobile terminal and the mathematical formula discussed above becomes known. This would also be possible if the secure network store of the random SIM unlock codes was accessed in an unauthorised manner.

It is desirable for the network that provides the mobile terminal to prevent or restrict third parties from providing SIM unlock codes.

According to a first aspect of the present invention, there is provided a method of verifying the validity of a message received by a telecommunications terminal which is operable in a boot mode and a runtime mode, the method including, in response to reception of the message when the terminal is in the runtime mode, verifying the validity of the message during the boot mode.

In an embodiment the telecommunications terminal is a mobile or cellular telecommunications terminal and the message is a SIM unlock message (not simply a SIM unlock code).

In the embodiments, when a mobile terminal is initially powered up, it first enters a boot mode. In this mode a basic set of instructions is loaded from a read only memory into the processor. These instructions are then executed, which allows the processor to load and subsequently execute the terminal's operating system. When the operating system is running, the mobile terminal is in the runtime mode.

In the embodiments, in the boot mode there is only one piece of code running at a time (a single threaded environment) and the code is generally quite simple compared with the complex multi-megabyte operating system. This means that the boot code is less likely to have bugs or security vulnerabilities that an attacker could exploit. The boot process is initiated from a static piece of code. The boot mode may be tightly controlled. Only code that has been approved—and digitally signed—by a trusted authority (generally the terminal manufacturer) may be run. This makes it hard for an attacker to run rogue code at boot time: they would need to get it signed by the terminal manufacturer. However, the boot code does need to be digitally signed if in ROM.

In accordance with the embodiments by configuring the mobile terminal to perform the step of verifying the validity of the message during the boot mode, the enhanced security of the boot mode is exploited to improve the reliability and security of the verification of the validity of the message. For example, if the verification of the validity of the message was performed in runtime, it is possible that an attacker could modify a runtime application stored on the mobile terminal so that it did not perform the verification of the message in the manner intended.

In an embodiment, the message includes a SIM unlock instruction in either encrypted or unencrypted form. A SIM unlock instruction, for instance a command for a terminal with a given IMEI to accept any SIM from next boot, does not require protecting in the same way as a SIM unlock code.

Accordingly, use of SIM unlock instructions may prevent the need to manage SIM unlock codes. The SIM unlock instructions may include a SIM unlock code in either encrypted or unencrypted form.

The message may also include a digital signature, and the verifying step may include checking the validity of the digital signature. In the embodiment, this is performed in the boot mode, by a key being accessed to check the validity of the digital signature. In the embodiment, the digital signature is generated using the private key of the entity that issues the SIM unlock message—an "administrator" in the embodiment. The key used to check the validity of the digital signature is the public key of the administrator.

Advantageously, the key used to check the validity of the digital signature is accessed from a predetermined store of the mobile terminal specified in the boot code for performing the boot stage. This may prevent the mobile terminal being modified in some way by an attacker so that the key is retrieved from a different location.

In the embodiment, the digital signature of the message is generated by the administrator by applying a hashing function to the SIM unlock instruction (or simply the SIM unlock code) in order to generate a message digest of that instruction. The message digest is then encrypted using the private key of the administrator. When performing the verification in the boot mode the digital signature is decrypted using the public key of the administrator, which is well known and widely distributed (it may be pre-stored in the mobile terminal, as mentioned above, during manufacture or may be provided in a certificate received from a certificate authority) to obtain the message digest. A hashing function possibly in the form of an algorithm corresponding to or identical to the hashing function used by the administrator is executed in the boot mode in order to generate a message digest of the SIM unlock instruction contained in the message. If the message digest generated by the boot mode hashing algorithm matches the message digest derived from the received message, then this indicates: (1) that the message was received from the administrator and not some unauthorised third party (because only the administrator has knowledge of its private key, and therefore the administrator is the only entity that can generate messages which can be decrypted by the administrator's public key), and (2) the message has not been altered during transmission from the administrator to the mobile terminal (because the message digests match).

The message may further include a certificate (in addition to the digital signature). This certificate is issued by a certificate authority (CA). The validity of this certificate can be verified by the mobile terminal contacting the certificate authority. For example, the mobile terminal can contact the certificate authority to determine whether the certificate has been revoked. Also, the certificate may indicate the term (time period) of its validity. The mobile terminal may check that the certificate is not outside its term—for example, by referring to a trusted time source. Advantageously, the validity of the certificate may be checked, and confirmed, during the runtime mode of the mobile terminal. Only after the validity of the certificate has been confirmed, does the processor cause the mobile terminal to enter the boot mode in order to verify the validity of the message (by checking the digital signature). Thus, the boot mode may only be entered when a message with a valid certificate is received.

The message may furthermore include a digital signature generated by the certificate authority (in addition to a digital signature generated by the administrator) to allow the mobile terminal to check that the certificate originates with the certificate authority and that the certificate has not been altered between being issued by the certificate authority and receipt by the mobile terminal. The digital signature of the certificate is generated by applying a hashing function to the certificate in order to generate a certificate digest. The certificate digest is then encrypted using a private key of the certificate authority. When performing the verification in the boot mode, the digital signature of the certificate authority is decrypted using the public key of the certificate authority. Successful decryption shows that the certificate authority signed the certificate and not an unauthorised party because only the certificate authority has knowledge of its private key and therefore the certificate authority is the only entity that can generate messages which can be decrypted by the certificate authority's public key. A hashing function corresponding to or identical to the hashing function used by the certificate authority is executed in the boot mode in order to generate a digest of the certificate. If the certificate digest generated matches that received in the message, then the certificate has not been altered during transmission between the certificate authority and the mobile terminal.

The public key of the certificate authority is advantageously accessed from a predetermined store of the mobile terminal specified in the boot code for performing the boot stage. In order to ensure that the public key of the certificate authority is the true key, for example it has not been tampered with by an attacker, the public key of the certificate authority must be securely stored or must be verifiable as being the true key. The public key of the certificate authority may be pre-stored on the mobile terminal during manufacture in a secure way. For example, the public key may be pre-stored on the ROM of the mobile terminal. Alternatively, the public key may be pre-stored in a store in the mobile terminal and a digest of the public key creates by applying a hashing function and pre-stored in the ROM. The authenticity of that public key can then be verified, by applying a hashing function corresponding to or identical to the hashing function used to create the public key digest in the ROM to create a new public key digest. The mobile terminal then determines whether the new public key digest and the public key digest in the ROM match. If they match this shows that the public key has not been tampered with.

The present invention also relates to a message verification system and telecommunications terminal, as defined in the independent claims.

For a better understanding of the present invention, embodiments will now be described with reference to the accompanying drawings, in which:—

Figure 3:
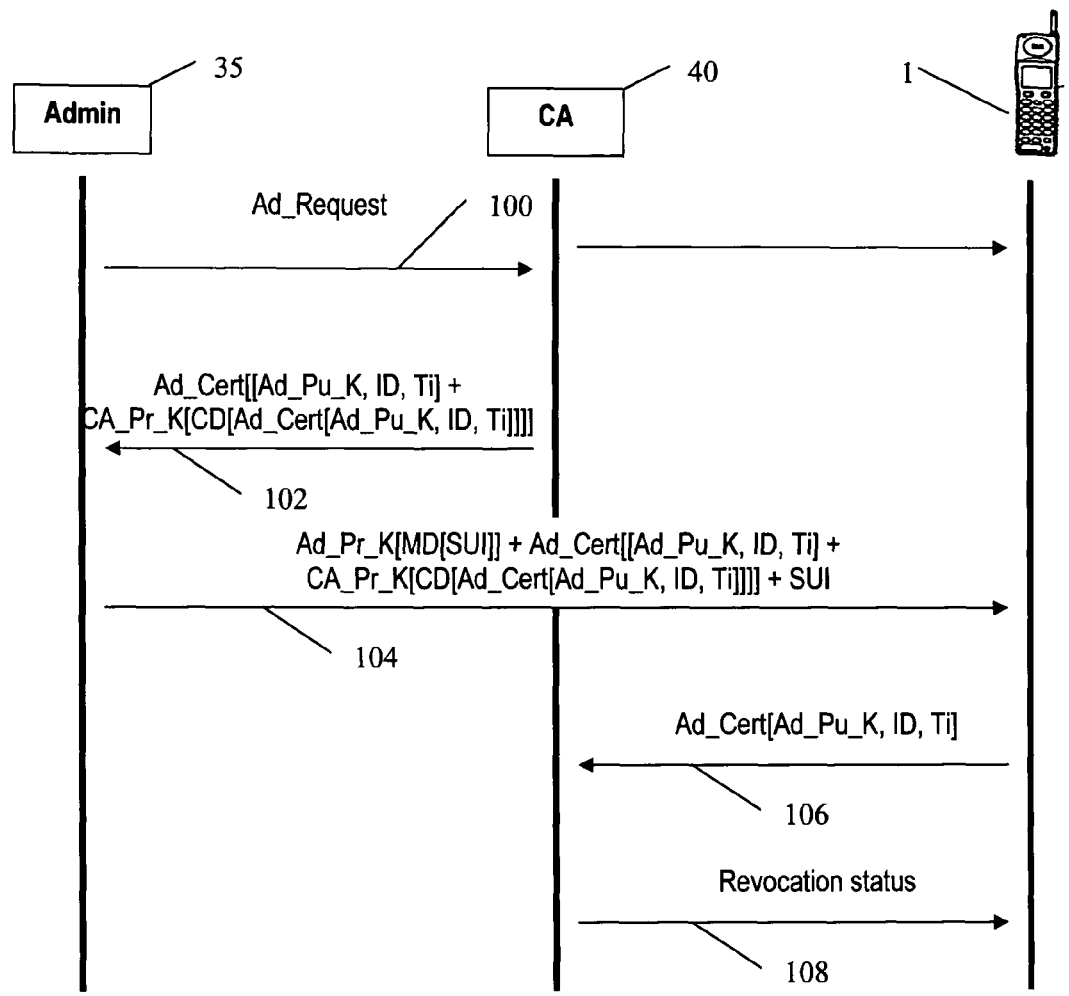
FIG. 3 shows the exchange of messages between the mobile terminal, administrator and certificate authority.
Figure 4:
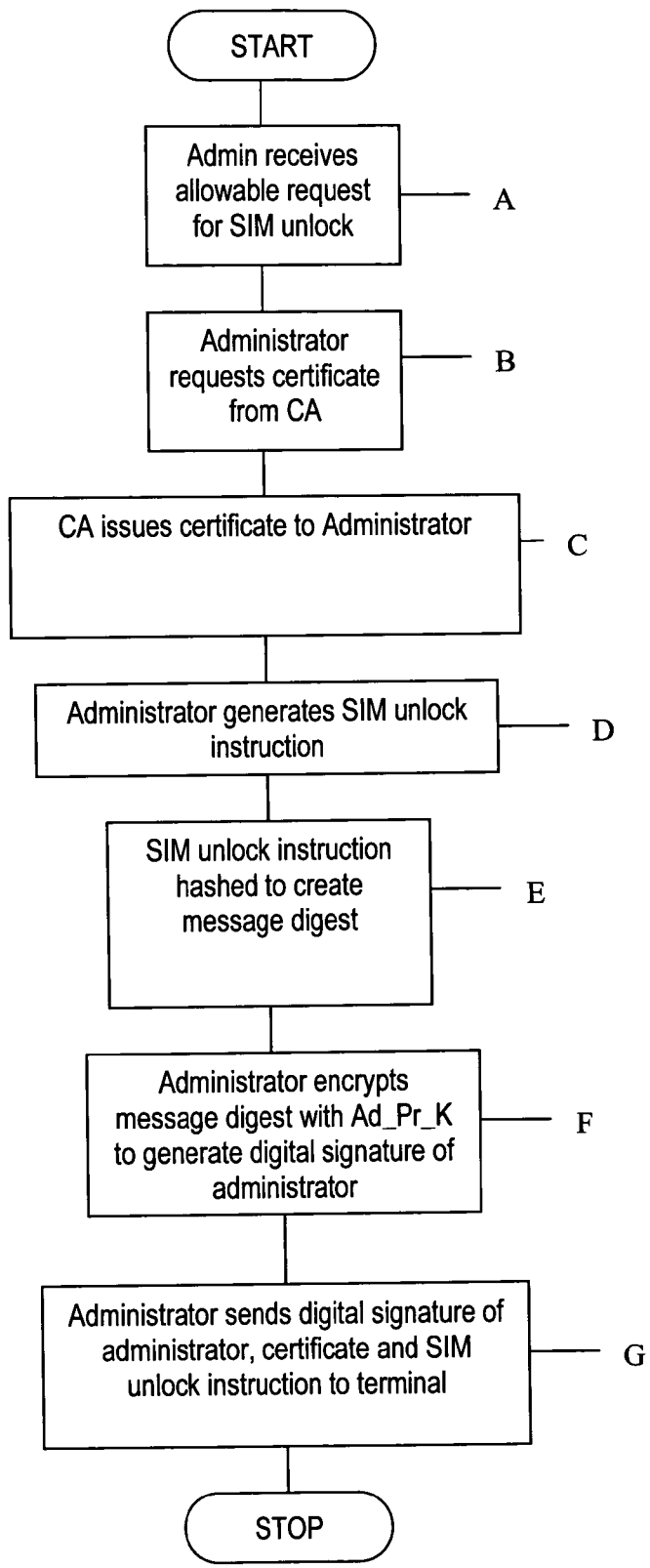
FIG. 4 is a flow chart showing the steps taken when the administrator receives a request to issue a SIM unlock message to a mobile terminal.
Figure 5:
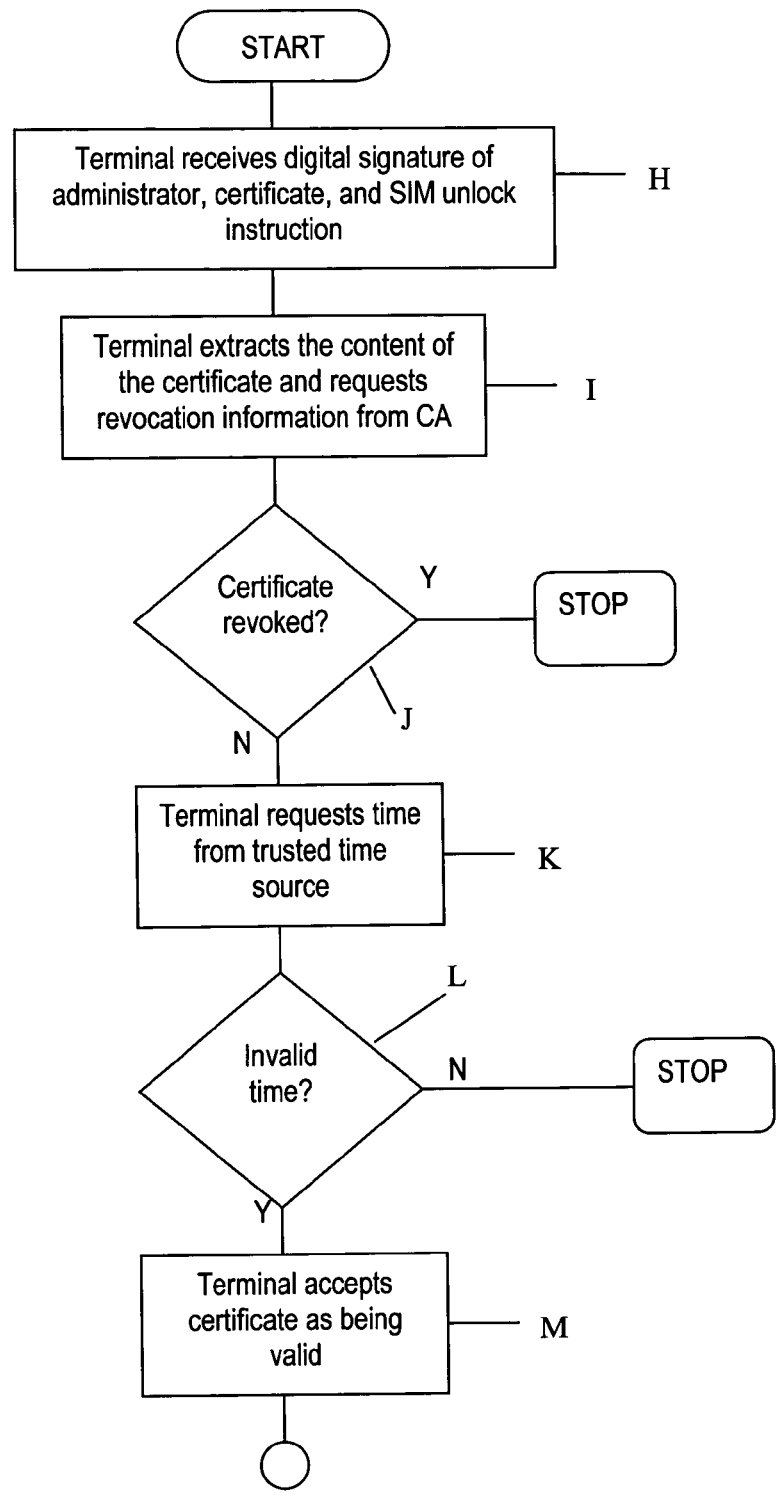
FIG. 5 is a flow chart which shows the steps taken by the mobile terminal to verify the validity of a certificate of a received SIM unlock message during the runtime mode.
Figure 13:
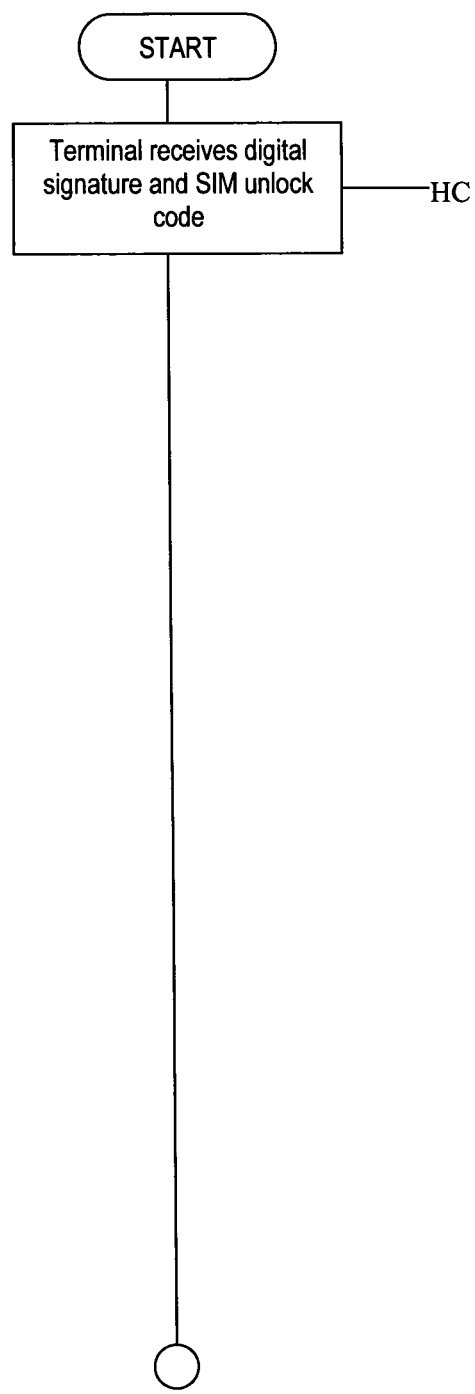
Figure 14:
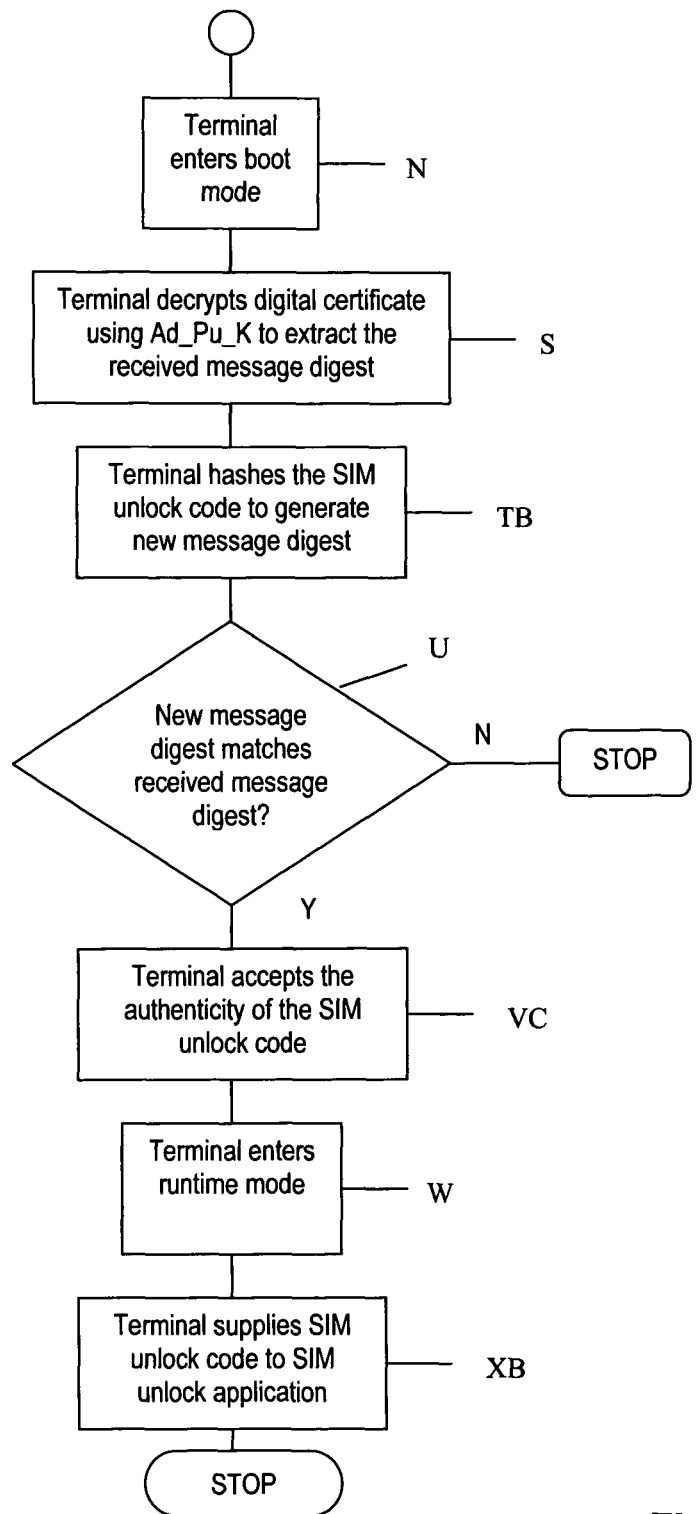
Figure 15:
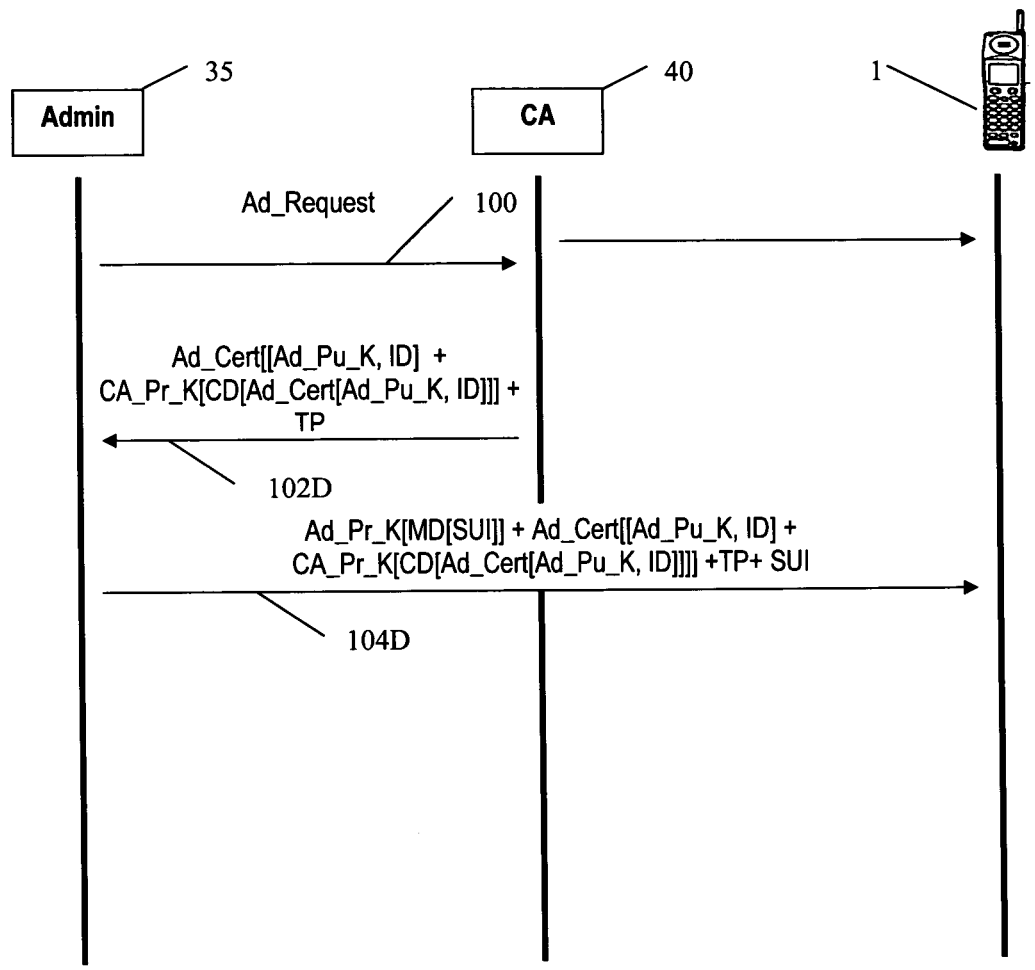
Figure 16:
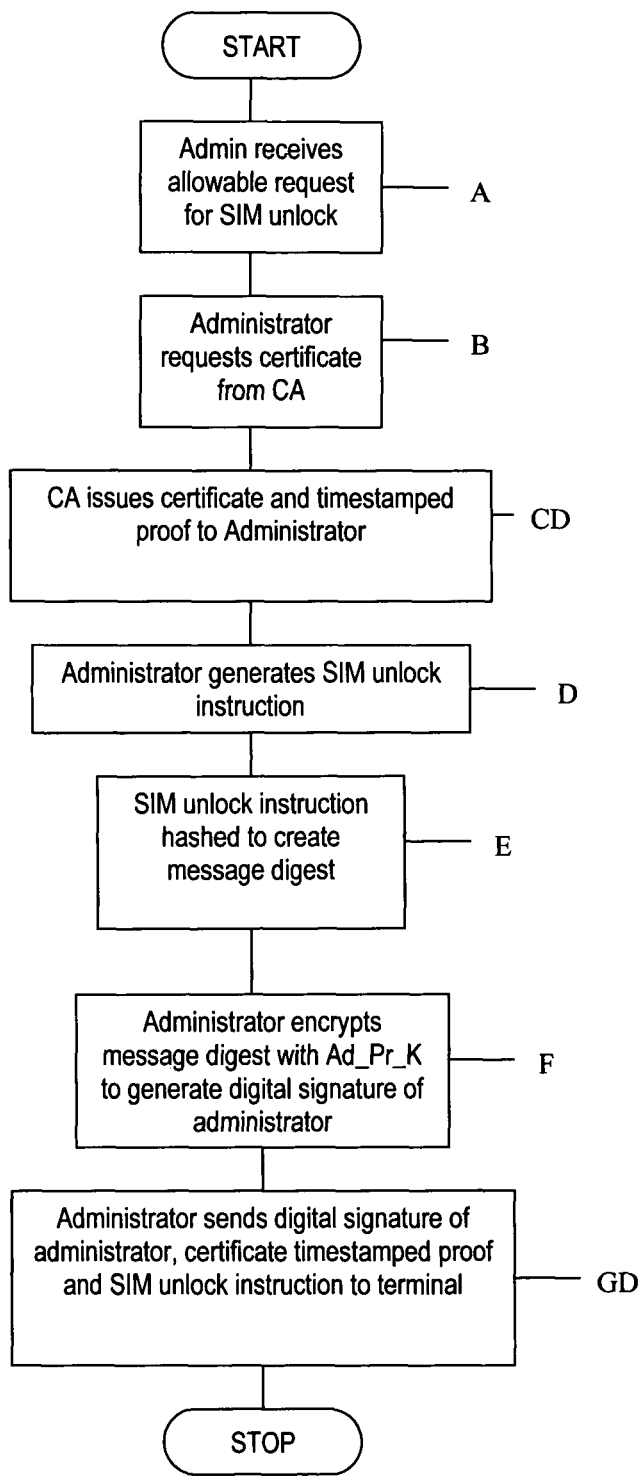
Figure 17:
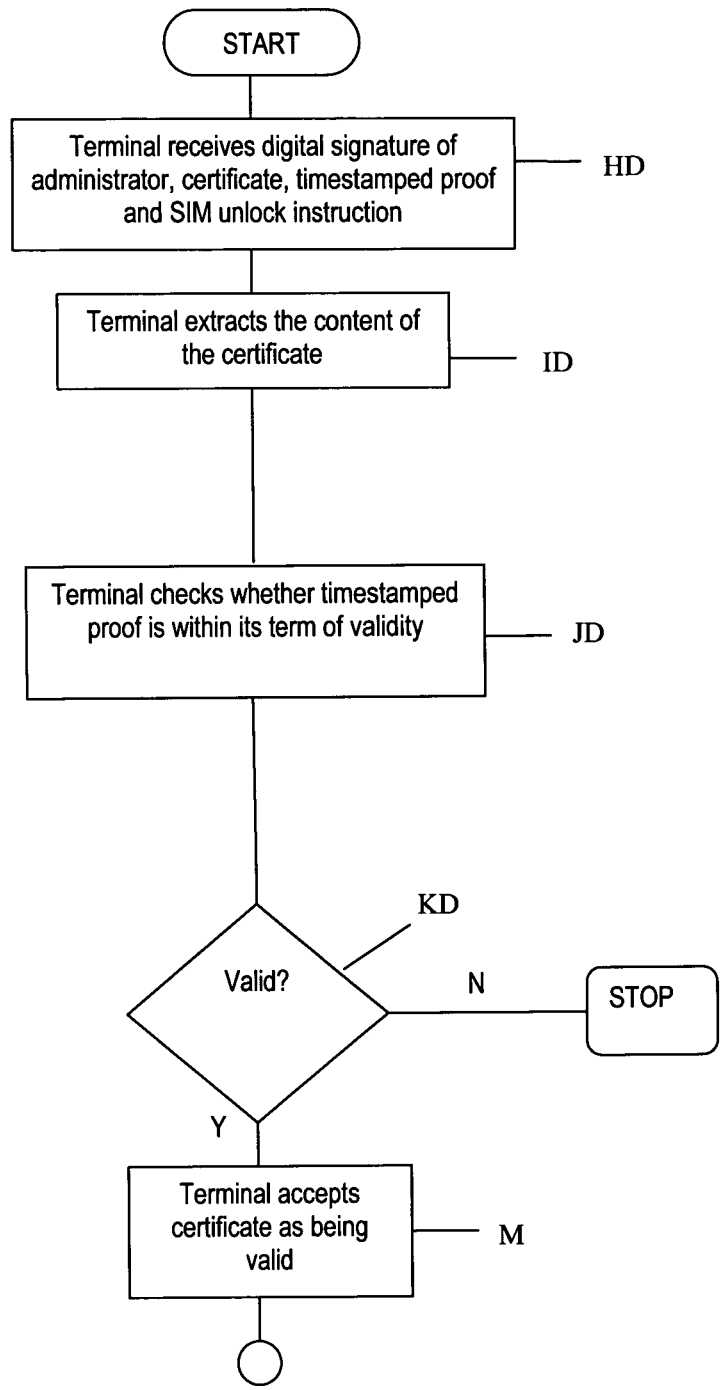

FIGS. 7, 8, 9 and 10 correspond to FIGS. 3, 4, 5 and 6, respectively, but modified in accordance with a second embodiment of the invention;

FIGS. 11, 12, 13 and 14 correspond to FIGS. 3, 4, 5 and 6, respectively, but modified in accordance with a third embodiment of the invention, FIGS. 15 and 16 correspond to FIGS. 3 and 4 respectively, but modified in accordance with a fourth embodiment of the invention; and FIG. 17 corresponds to FIG. 5 in accordance with the fourth embodiment of the invention.

In the drawings like elements are designated with the same reference signs.

Elements of a conventional mobile or cellular network will now be briefly described with reference to FIG. 1.

Figure 1:
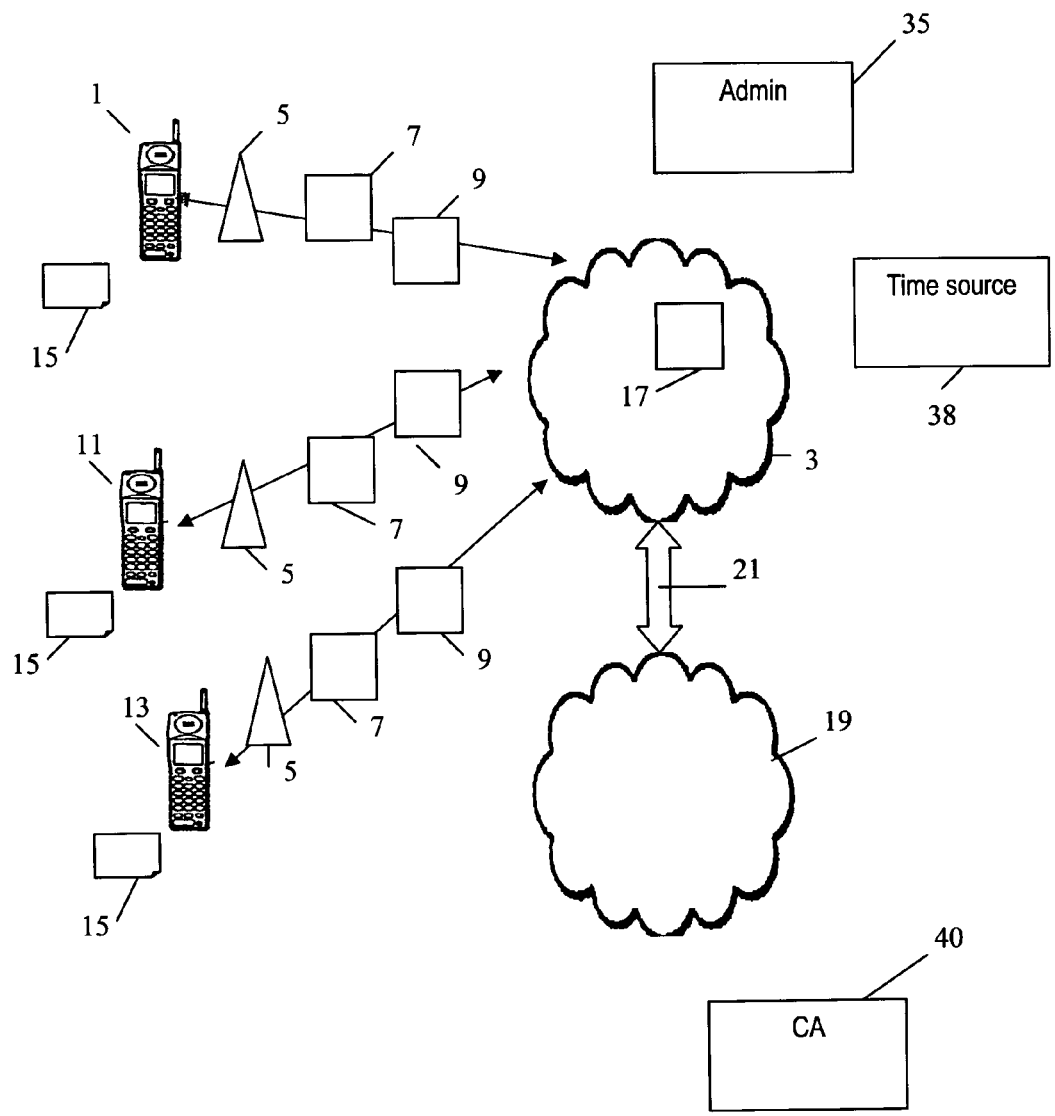
FIG. 1 shows schematically the elements of a telecommunications network.

FIG. 1 shows schematically a network in which the invention may be used. The figure shows a cellular network. However, it should be appreciated that the invention is applicable to any type of network, although it is particularly applicable to a network where at least some of the devices communicate using mobile telecommunications/wireless data transmission.

Mobile terminal 1 is registered with GSM/GPRS or UMTS (3G) mobile telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via GPRS support nodes (SGSN) 9, which may be connected by a fixed (cable) link to the mobile telecommunications network 3.

In the conventional manner, a multiplicity of other mobile terminals are registered with the mobile telecommunications network 3. These mobile terminals include mobile terminals 11 and 13. The terminals 11 and 13 communicate with the mobile telecommunications network 3 in a similar manner to the terminal 1, that is via an appropriate Node B 5, RNC 7 and SGSN 9.

The mobile telecommunications network 3 includes a gateway GPRS support node (GGSN) 17 which enables IP-based communications with other networks, such as the Internet or other IP network 19 via an appropriate link 21.

Each of the mobile terminals 1, 11 and 13 is provided with a respective subscriber identity module (SIM) 15. During the manufacturing process of each SIM, authentication information is stored thereon under the control of the mobile telecommunications network 3. The mobile telecommunications network 3 itself stores details of each of the SIMs issued under its control. In operation of the mobile telecommunications network 3, a terminal 1, 11, 13 is authenticated (for example, when the user activates the terminal in the network with a view to making or receiving calls) by the network sending a challenge to the terminal 1,11,13 incorporating a SIM 15, in response to which the SIM 15 calculates a reply (dependent on the predetermined information held on the SIM—typically an authentication algorithm and a unique key Ki) and transmits it back to the mobile telecommunications network 3. The mobile telecommunications network 3 includes an authentication processor 17 which generates the challenge and which receives the reply from the terminal 1, 11, 13.

Using information pre-stored concerning the content of the relevant SIM 15, the authentication processor calculates the expected value of the reply from the mobile terminal 1, 11, 13. If the reply received matches the expected calculated reply, the SIM 15 and the associated mobile terminal are considered to be authenticated.

It should be understood that such an authentication process can be performed for any terminal provided with a SIM 15 under control of the mobile telecommunications network 3. In the embodiment the terminal communicates wirelessly with the mobile telecommunications network 3 via the network's radio access network, although this is not essential. For example, the terminal may communicate with the network via the fixed telephone network (PSTN), via a UMA "access point" and/or via the Internet.

The SIM 15 used by the terminal 1,11,13 may be a SIM of the type defined in the GSM or UMTS standards specifications, or may be a simulation of a SIM—that is, software or hardware that performs a function corresponding to that of the SIM. The SIM may be in accordance with the arrangement described in WO-A-2004 036513.

The mobile terminal 1 (and any other terminals having a subscription with the network 3) may be locked to the SIM 15, which is also provided by the network 3. For example, the terminal 1 may be configured so that it will only fully operate when it is functionally associated with the SIM 15 issued by the network 3, and not by any other mobile or cellular telecommunications network.

Figure 2:
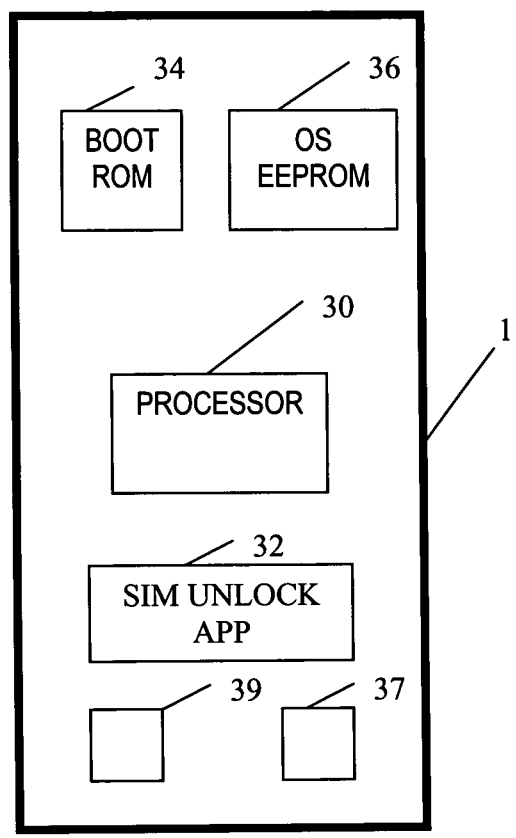
FIG. 2 shows schematically some elements present in a mobile telecommunications terminal in accordance with the embodiments.

Referring now to FIG. 2, the mobile terminal 1 is provided with a processor 30 which, during the runtime mode of the mobile terminal 1 runs the operating system, such as Symbian®. The mobile terminal 1 is also provided with a SIM unlock application 32, which may typically be pre-stored thereon during manufacture or prior to shipping to an end user by the network 3. The SIM unlock application 32 is configured to remove or modify the restrictions on the full operation of the mobile terminal with particular SIMs 15 (such as to remove the restriction of the mobile terminal to only fully operate with SIMs issued by the network 3) on receipt of a particular SIM unlock instruction. The SIM unlock application 32 includes additional functionality over a conventional SIM unlock application, in order to perform verification of the SIM unlock message in accordance with the invention.

An administrator 35 (FIG. 1) is associated with the mobile network 3 to issue SIM unlock messages in response to requests from the network 3.

Referring again to FIG. 2, the mobile terminal 1 is provided with a boot ROM 34 which stores a boot strap loader program.

On power up of the mobile terminal 1 a power-on self test (POST) procedure is performed which examines the hardware of the mobile terminal 1 to ensure that the hardware components are working correctly. Once the POST procedure has been successfully completed, the boot strap loader program is loaded into the processor 30 from the boot ROM 34. The primary purpose of the boot strap loader program, during the boot mode, is to allow the processor 30 to load and configure the operating system stored in memory 36. When this task has been completed by the boot strap loader, during the boot mode, the mobile terminal 1 then enters the runtime mode during which the operating system is fully operational for allowing user interaction with the mobile terminal using the keypad and GUI and to enable the mobile terminal to access the network 3 by means of the radio access network 5,7.

It is known for boot strap loader programs to verify that the boot strap loader program itself has not been modified or corrupted by verifying a digital signature of the boot strap loader program during the boot mode. If the digital signal is verified during the boot mode, this indicates that the boot strap loader program has not been modified or corrupted.

US-A-2006/0136705 (Motorola) discloses a mobile telecommunications device that can install a software component thereon, and which, during the boot operation, verifies the software component using a digital signature or the like.

The boot strap loader program is, relative to the operating system, a simple program that is executed by the processor 30 in a single threaded environment (i.e. no other programs are run by the processor 30 simultaneously). The boot strap loader program, because of its relative simplicity, is less likely to have bugs or security vulnerabilities. Also, because the boot strap loader program verifies its digital signature each time it is executed, using the digital signature provided by a trusted authority (generally the manufacturer of the terminal 1), it is not possible for unauthorized parties to modify the boot strap loader program. In contrast, it is relatively easy for a third party to modify the operating system stored in the memory 36 and/or to modify or download new applications for execution by the processor 30 during the runtime mode of the processor 30.

In accordance with an important feature of the embodiments of the invention, the relative simplicity, stability and security of the boot mode is used to verify a SIM unlock message received by the mobile terminal 1 from the network 3.

The steps performed when the user of the mobile terminal 1 wishes to remove the SIM lock restriction of their mobile terminal 1 will now be described with reference to FIG. 3 and the flow charts of FIGS. 4, 5 and 6. As has already been described in relation to FIG. 1, the administrator 35 is associated with the network 3 and stores or is able to obtain or generate SIM unlock instruction for each mobile terminal 1,11,13 which subscribes to the network 3. An arrangement between a trusted certificate authority (CA) 40 and the network 3 enables the certificate authority 40 to issue certificates to certify communications from the administrator 35. The certificate authority communicates with the network 3 via the IP network 19 and link 21, although it could be connected to the network 3 by other means.

The certificate authority 40 has a public key (certificate authority public key CA_Pu_K) which is distributed without restriction to mobile terminals 1,11 and 13 and a private key (certificate authority private key CA_Pr_K) that is known only to the certificate authority 40. The keys are mathematically related in the conventional manner, but it is computationally infeasible to deduce one from the other. The public key of the certificate authority 40 is stored in the boot ROM 34.

Similarly, the administrator 35 has a public key (Ad_Pu_K) which is distributed without restriction to mobile terminals 1,11,13 and a private key (Ad_Pr_K) that is known only to the administrator 35. The keys are mathematically related in the conventional manner, but it is computationally infeasible to deduce one from the other.

At step A of the FIG. 4 flow chart the administrator 35 receives an allowable request for unlocking the SIM of mobile terminal 1. Such a request may be received by the network 3 from the user of the mobile terminal 1. The allowability of the request may depend on the contractual relationship between the user of the mobile terminal 1 and the network 3. If the network 3 considers the request to be allowable, a message to issue a SIM unlock instruction may then be generated by the network 3 and sent to the administrator 35.

At step B the administrator 35 requests that the certificate authority 40 provides it with a certificate (Ad_cert) to verify the administrator's identity. This is shown as message 100 in FIG. 3. The certificate authority 40 generates certificate contents for the administrator 35 which includes the following information:
- The administrator 35 public key (Ad_Pu_K)
- Optional information relating to the identity of the administrator (ID)
- Optionally a time period (Ti) during which the certificate is valid.

The certificate authority 40 executes a one-way hash function on the certificate contents to generate a certificate digest CD[Ad_Pu_K, ID, Ti]—that is, a value representative of the certificate contents but from which the certificate cannot be derived. The certificate digest is then encrypted (signed) using the certificate authority's private key (CA_Pr_K) and is combined with the certificate contents to form the certificate (Ad_Cert) which can be represented as: Ad_Cert[[Ad_Pu_K, ID, Ti]+CA_Pr_K[CD[Ad_Cert[Ad_Pu_K, ID, Ti]]]].

At step C the certificate authority 40 sends the certificate Ad_Cert[[Ad_Pu_K, ID, Ti]]+[Pr_K[CD[Ad_Cert[Ad_Pu_K, ID, Ti]]]] to the administrator 35 in message 102.

As shown in FIG. 1, the administrator 35 is connected to the certificate authority 40 via the mobile telecommunications network 3, the link 21 and the IP network 19. This allows data to be exchanged between the administrator 35 and the certificate authority 40.

At step D the administrator 35 retrieves or generates the SIM unlock instruction (SUI) for the mobile terminal 1. The SIM unlock instruction includes the IMEI or MCC of the mobile terminal 1.

At step E the administrator 35 activates a hashing algorithm which hashes the SIM unlock instruction (SUI) for the mobile terminal 1 to create a message digest (MD[SUI])—that is, a value representative of the SIM unlock instruction (SUI) but from which the SIM unlock instruction (SUI) cannot be derived. The hash algorithm is a one-way hashing algorithm.

At step F the administrator 35 encrypts the message digest (MD [SUI]) using the administrator 35 private key (Ad_Pr_K) to generate a digital signature, digital signature: Ad_Pr_K[MD[SUI]].

At step G the administrator 35 sends the digital signature of the administrator 35 (encrypted message digest Ad_Pr_K [MD[SUI]]), the certificate (Ad_Cert) and the SIM unlock instruction (SUI) to the terminal 1 in message 104:

Ad_Pr_K[MD[SUI]]+Ad_Cert[[Ad_Pu_K,ID,Ti]+
CA_Pr_K[CD[Ad_Cert[Ad_Pu_K,ID,Ti]]]]+SUI This message 104 is sent from the administrator 35 to the network 3 then transmitted to the mobile terminal 1 via SGSN 9 and radio access network, 5,7.

As will be appreciated from the flow chart of FIG. 4 in the associated description above, the SIM unlock message 104 transmitted to the mobile terminal 1 in accordance with this embodiment differs from a conventional SIM unlock code in that it additionally comprises a SIM unlock instruction (SUI) together with the administrator 35 digital signature—AD_Pr_K[MD[SUI]]—and the certificate Ad_Cert—issued by the certificate authority 40.

The flow chart of FIG. 5 shows the steps taken when the mobile terminal 1 receives the message 104 from the administrator 35—step H. The message 104 will only be receivable by the mobile terminal 1 when the mobile terminal 1 is connected to the network 3 via the radio access network 5,7. This is only possible when the mobile terminal 1 is operating in the normal runtime mode. The message 104 may be transmitted by any suitable mechanism, such as an SMS message, WAP push etc. The message is transmitted over the air.

The received message 104 is processed by the processor 30 (FIG. 2) and is identified as being data for processing by the SIM unlock application 32. The SIM unlock application 32 is activated by the processor 30 to process the message 104. The SIM unlock application 32 identifies that the message 104 includes the digital signature (Ad_Pr_K[MD[SUI]]) relating to a SIM unlock instruction, the certificate (Ad_Cert) from the certificate authority 40 and the SIM unlock instruction (SUI).

At step I the content [Ad_Pu_K,ID,Ti] of the certificate (Ad_cert) is extracted. The administrator public key (AD_Pu_K) is stored in store 37. The mobile terminal 1 then generates a message to request verification of the validity of the certificate by the certificate authority 40. A certificate status request is sent to the certificate authority 40 from the mobile terminal 1 in message 106.

At step J the certificate authority 40 determines whether the certificate is revoked. The certificate might be revoked, for example if the private key of the administrator 35 (AD_Pr_K) is known to have been compromised (by being disclosed to unauthorised third parties, for example). The revocation status of the certificate is then transmitted from the certificate authority 40 to the mobile terminal 1 over the air, via the radio access network 5,7 in message 108.

If the message 108 indicates that the certificate is revoked, the SIM unlock code (SUI) is not processed further. Optionally, an indication may be given to the user on the display of the mobile terminal 1 that the SIM unlocking has been unsuccessful.

If message 108 indicates that the certificate is valid (and not revoked) then, at step K, the mobile terminal 1 requests the current time. The current time may be provided by an internal secure clock on the mobile terminal 1 or obtained from a time source 38 (FIG. 1) associated with the network 30.

At step L the current time is compared to the time period indication Ti for which the certificate provided by the certificate authority 40 is valid. If the current time is outside the valid time period Ti of the certificate, the process is stopped. Optionally, the user of the mobile terminal may be given an indication that the process has stopped on the display of the mobile terminal 1. If the current time is within the time period Ti specified in the certificate, the terminal accepts the certificate as being valid—step M.

After step M, the mobile terminal 1 may automatically pass to step N (FIG. 6) in order to verify the validity of the digital signature Ad_Pr_K[MD[SUI]]. However, there may be a delay before step N is performed, in dependence upon what other tasks are being performed by the mobile terminal 1. For example, if the user of the mobile terminal 1 has a current communication session active, the processor 30 may delay performing step N until the communication session is ended.

At step N the terminal 1 enters the boot mode. That is, the mobile terminal 1 effectively re-initialises the processor 30. The runtime mode is ended, and the operating system ceases to run, as does the SIM unlock application 32. The boot strap loading program is retrieved from boot ROM 34 by the processor 30 and the boot strap program is executed by the processor 30.

In accordance with this embodiment of the invention, the boot strap loading program checks that it has not been altered or corrupted in the conventional manner, as described above, by checking the digital signature of the boot strap loading program. However, the boot strap loading program is different from a conventional boot strap loading program of the mobile terminal in that it detects that a SIM unlock message 104 has been received, and includes instructions for verifying the validity of the SIM unlock message. These instructions of the boot strap loading program are performed by steps O, P, Q and R of the flow chart of FIG. 6.

At step O, the boot strap loader program retrieves the public key of the certificate authority from the boot ROM 34 and decrypts the digital signature (the encrypted certificate digest CA_Pr_K[CD[Ad_Cert[Ad_Pu_K, ID, Ti]]]) of the certificate authority 40.

At step P, the mobile terminal 1 uses a one-way hash function on the certificate to create a new certificate digest. The hash function may be the algorithm of the public key of the certificate authority 40. The mobile terminal 1 then compares (step Q) the new certificate digest with the certificate digest received in the SIM unlock message. If the new certificate digest matches with the received certificate digest then the authenticity of the certificate can be accepted at step R because the successful decryption of the digital signature of the certificate authority 40 using the public key of the certificate authority (CA_Pu_K) indicates that the signature was generated using the private key (CA_Pr_K) of the certificate authority 40. As only the certificate authority 40 should know its private key (CA_Pr_K), this confirms that the certificate authority 40 did indeed send the certificate, rather than an unauthorized third party. The steps described in relation to the flow chart of FIG. 5 independently indicate that the private key of the administrator 35 has not been compromised. Further, the calculation and comparison of the certificate digests confirm that the certificate received has not been altered since it was generated by the certificate authority 40. If the certificate digests do not match, the SIM unlocking procedure is terminated.

At step S, the digital signature contained in the SIM unlock message 104 is decrypted using the administrator 35 public key (Ad_Pu_K) stored in store 37 and that was extracted from the certificate (Ad_Cert). This allows the message digest MD of the SIM unlock instruction MD [SUI] to be extracted.

At step T the SIM unlock instruction (SUI) from the message 104 is hashed using a hashing algorithm that is the same as the hashing algorithm employed to generate the message digest by the administrator 35. The messagedigest generated by the terminal and the message digest received from the administrator 35 are compared at step Q.

At step U, if the message digests do not match, the process is stopped and the SIM unlock operation terminates. However, if the message digests match, the terminal 1 accepts the authenticity of the SIM unlock instruction (SUI) from the message 104—step V. The authenticity of the SIM unlock instruction (SUI) can be accepted at step R because the successful decryption of the digital signature (Ad_Pr_K[MD [SUI]]) using the administrator's 35 public key (Ad_Pu_K) indicates that the digital signature was generated using the administrator 35 private key (Ad_Pr_K). As only the administrator 35 should know its private key (Ad_Pr_K), this indicates that the administrator 35 did indeed send the SIM unlock message 104, rather than an unauthorised third party. The steps H to M described in relation to the flow chart of FIG. 5 independently confirm that the administrator's 35 private key (Ad_Pr_K) has not been compromised and that the administrator 35 is authorised to issue SIM unlock messages. Further, the calculation and comparison of the message digests confirm that the SIM unlock instruction (SUI) received has not been altered since it was generated by the administrator 35.

The SIM unlock instruction (SUI) is then stored in an appropriate storage location 39 of the mobile terminal.

At step W the mobile terminal 1 then enters the runtime mode. The processor 30 loads and runs the operating system 36. The presence of the SIM unlock instruction (SUI) in store 39 is detected by the processor 30, which prompts the processor 30 to retrieve the SIM unlock instruction (SUI) from the store 39 and to activate the SIM unlock application 32 while providing that application 32 with the SIM unlock instruction (SUI). The SIM unlock application 32 then operates to compare the IMEI in the received SIM unlock instruction (SUI) with the IMEI of the mobile terminal 1 (for example at manufacture). If the IMEI on the mobile terminal 1 and IMEI in the SIM unlock instruction match, the SIM unlock application will modify the mobile terminal 1 in such a way that the restriction on the type of SIMs 15 that are operable with the mobile terminal is modified or removed.

FIGS. 7 to 10 show a second embodiment of the invention, which is a modification to the first embodiment. In this modification, rather than the SIM unlock instruction (SUI) being sent in the clear from the administrator 35 to the mobile terminal 1, a SIM unlock code (SUC) is sent. A code corresponding to the SIM unlock code is stored securely on the mobile terminal 1, for example during manufacture of the mobile terminal, for access by the SIM unlock application. In this modification, the SIM unlock application is able to compare a received SIM unlock code with the stored SIM unlock code. If the SIM unlock codes match, the SIM unlock application will modify the mobile terminal 1 in such a way that the restriction on the type of SIMs 15 that are operable with the mobile terminal is modified or removed. In this embodiment, the SIM unlock code (SUC) is encrypted using a secret key (SK) shared between the mobile terminal 1 and the administrator: SK [SUC]. Thus, the message 104 (FIG. 3) of the first embodiment is modified to take the form of message 104B (FIG. 7), i.e.:

Ad_Pr_K[MD[SUC]]+Ad_cert[[Ad_Pu_K,ID,Ti]+
CA_Pr_K[CD[Ad_cert[Ad_Pu_K,ID,Ti]]]]+SK
[SUC]

Figure 8:
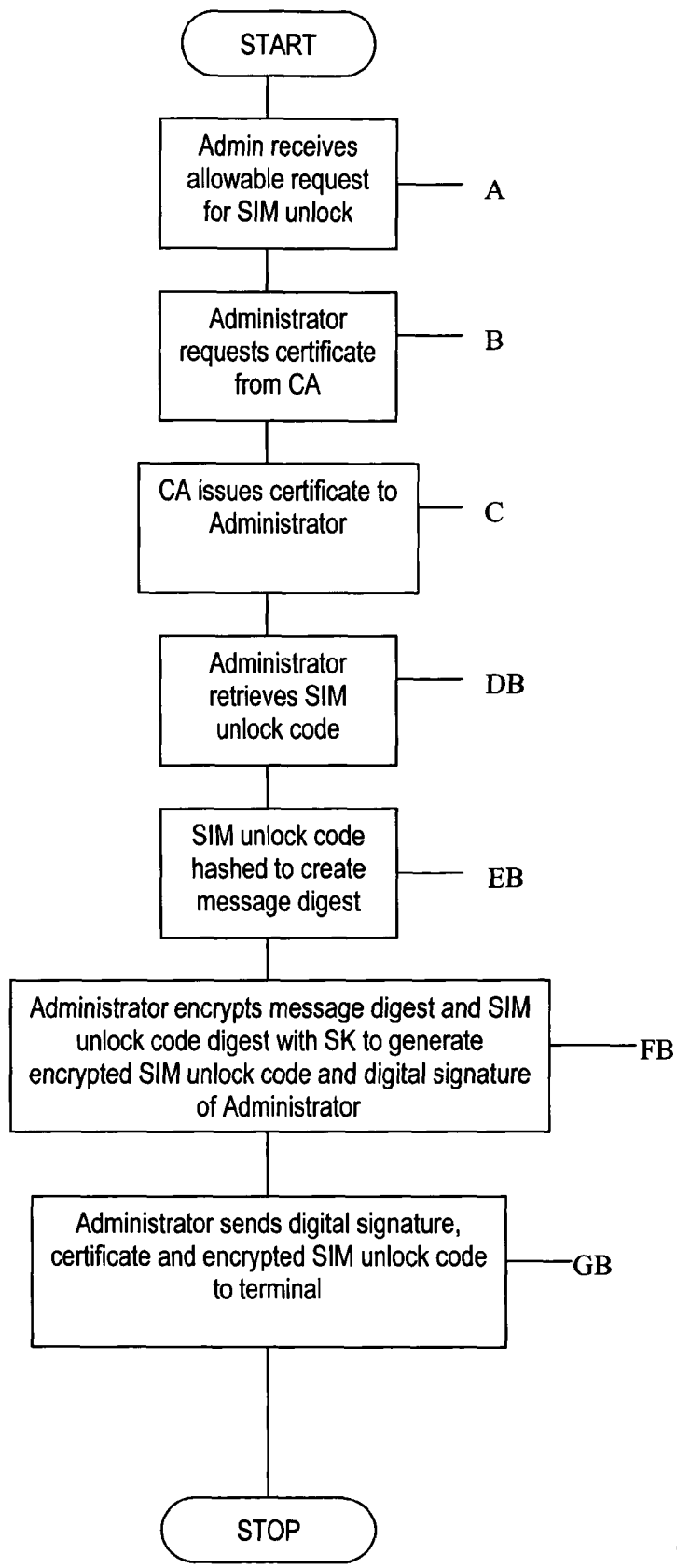

Referring to the flow chart of FIG. 8, which corresponds to the flow chart of FIG. 4 of the first embodiment, steps A to C are performed as in the first embodiment. New step DB is modified from step D so that the administrator retrieves a SIM unlock code. New step EB is modified from step E so that the SIM unlock code is hashed to create a message digest. At new step FB, the administrator 35 performs the encryption of the SIM unlock code (SUC) with the shared secret key (SK) to generate the encrypted SIM unlock code: SK[SUC] and also encrypts the message digest with the administrator private key to generate a digital signature (the encrypted message digest). Step G is modified (step GB in FIG. 8) in that the administrator sends the digital signature of the administrator 35, certificate and encrypted SIM unlock code to the terminal 1 (in message 104B).

Figure 6:
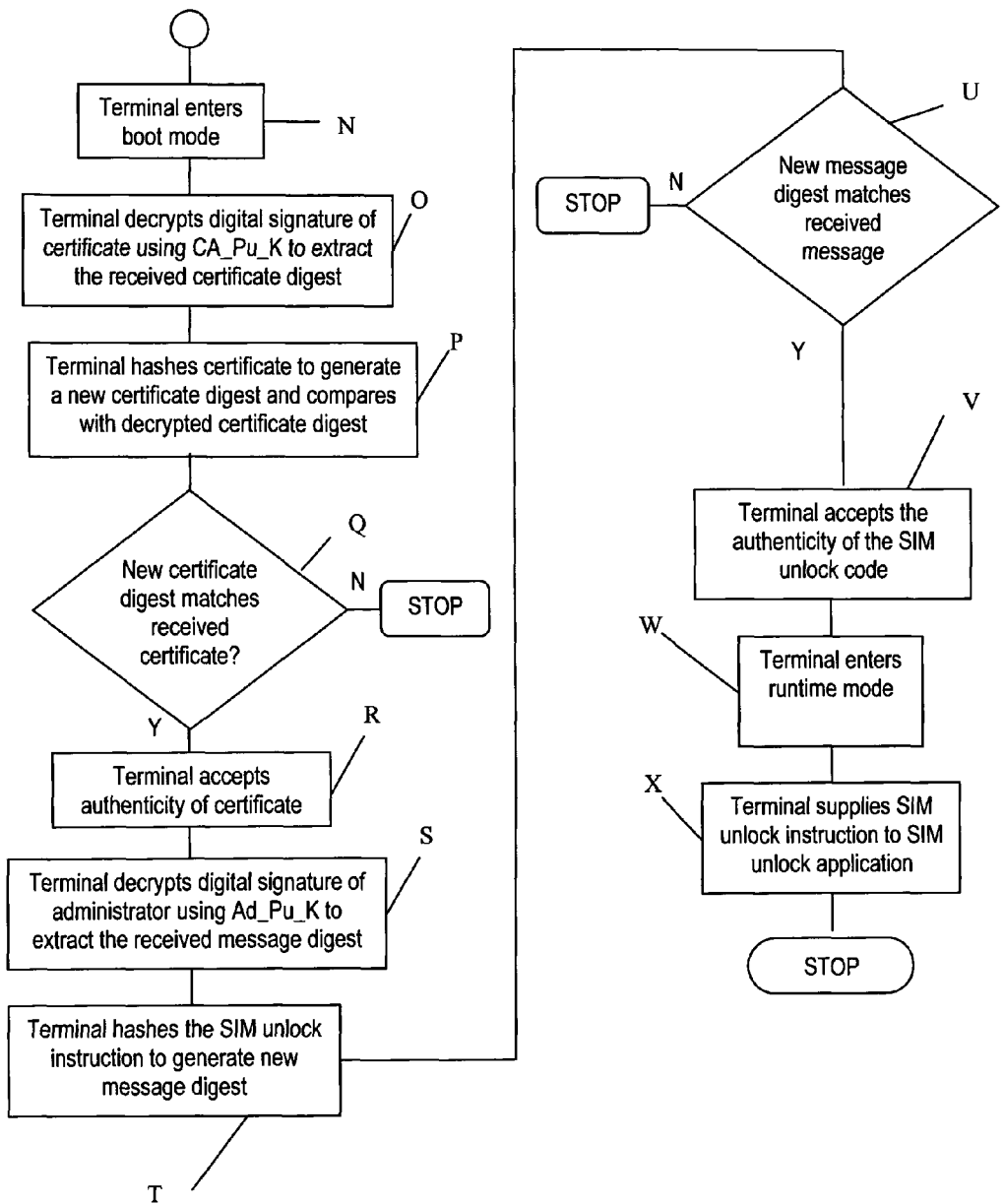
FIG. 6 is a flow chart showing the subsequent steps taken by the mobile terminal to verify the digital signature of the received SIM unlock message during the boot mode.
Figure 7:
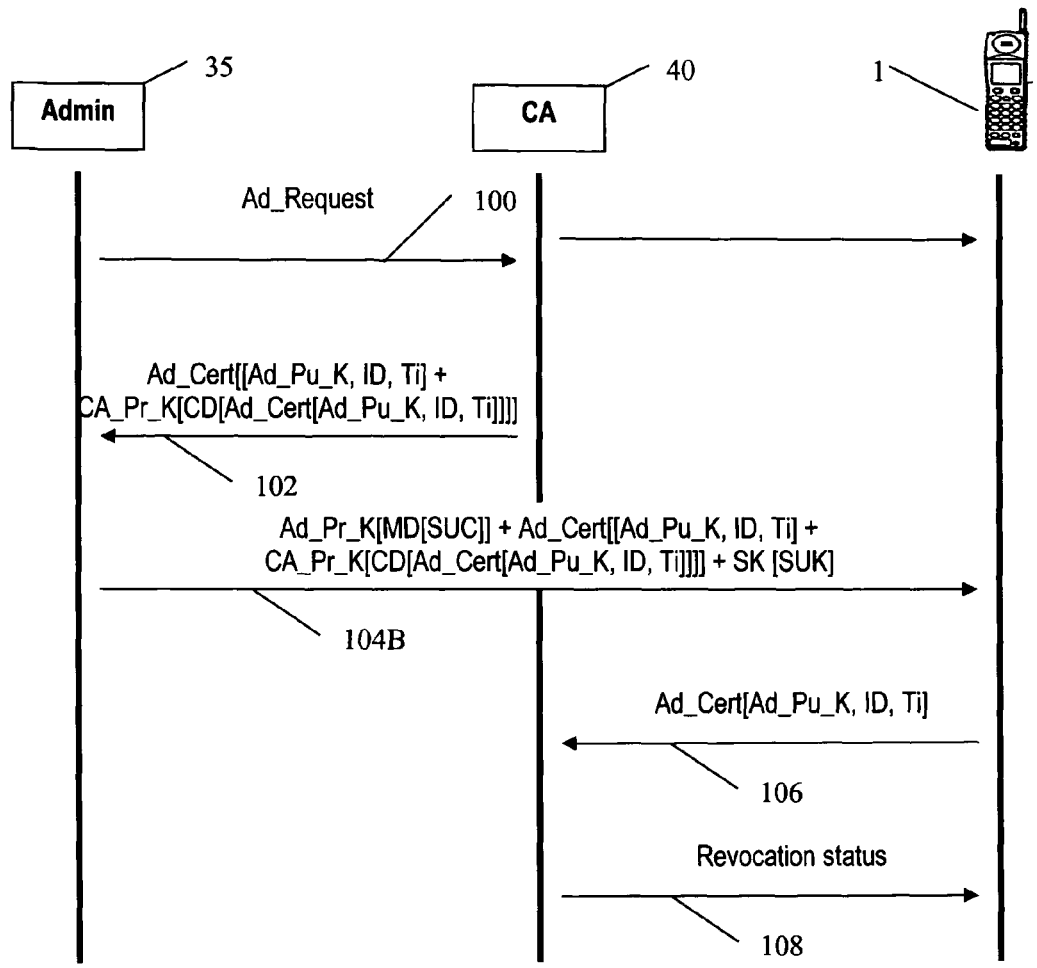
Figure 9:
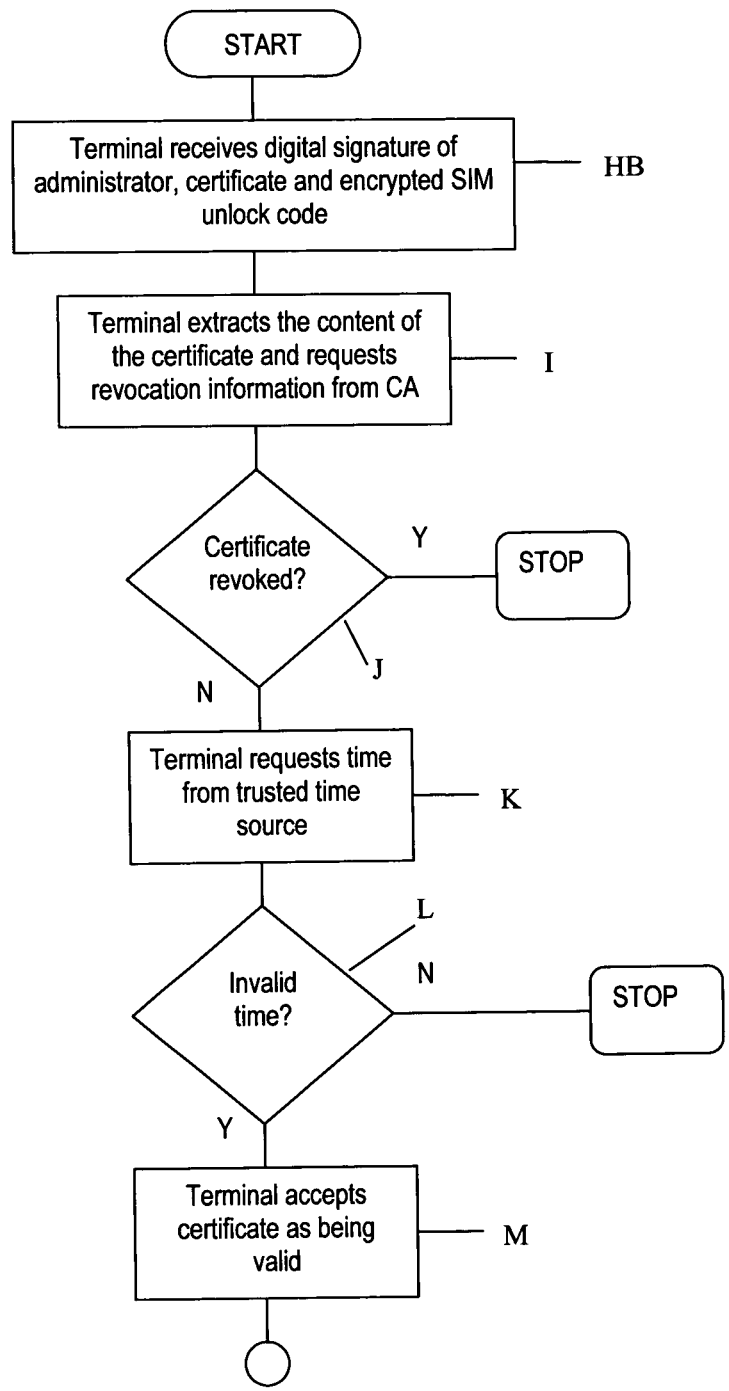
Figure 10:
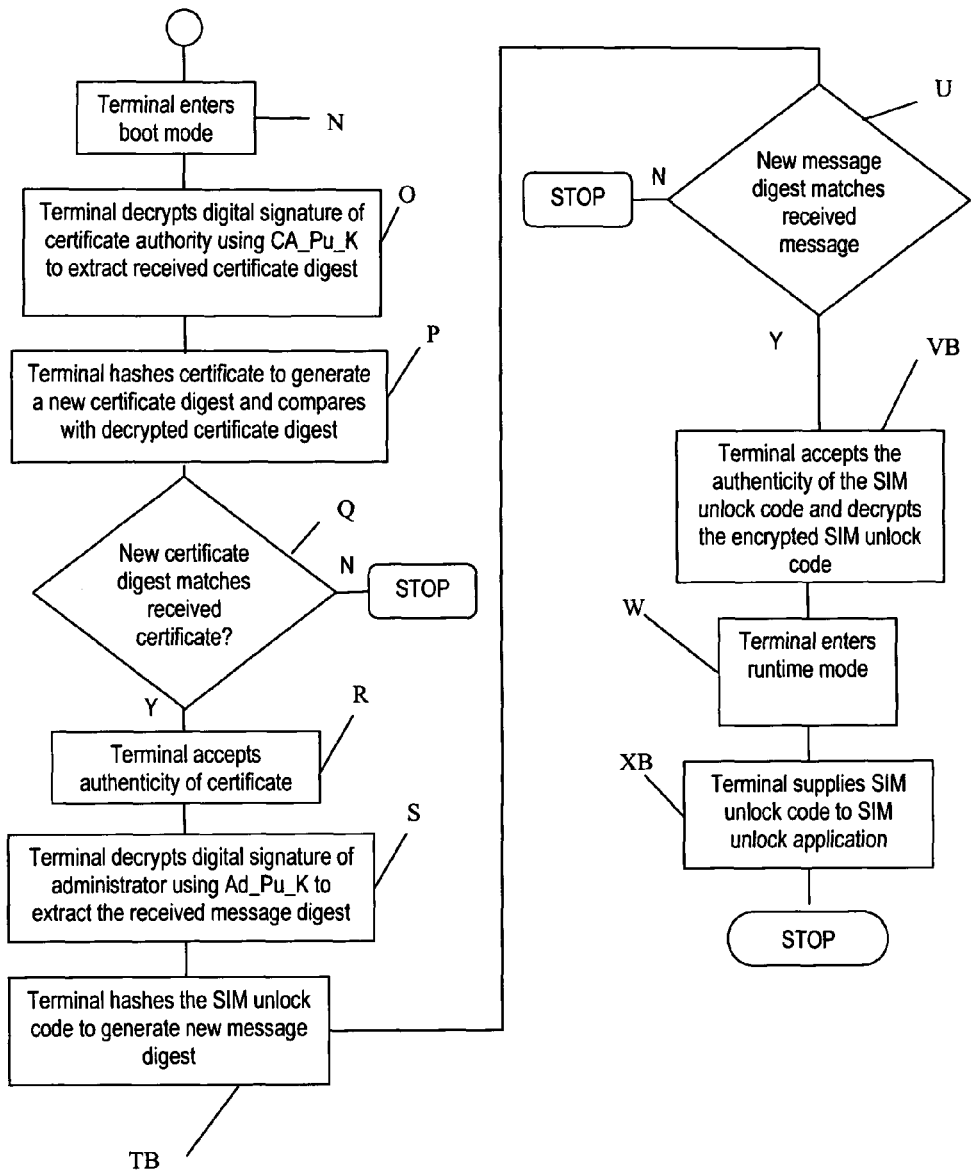
Figure 11:
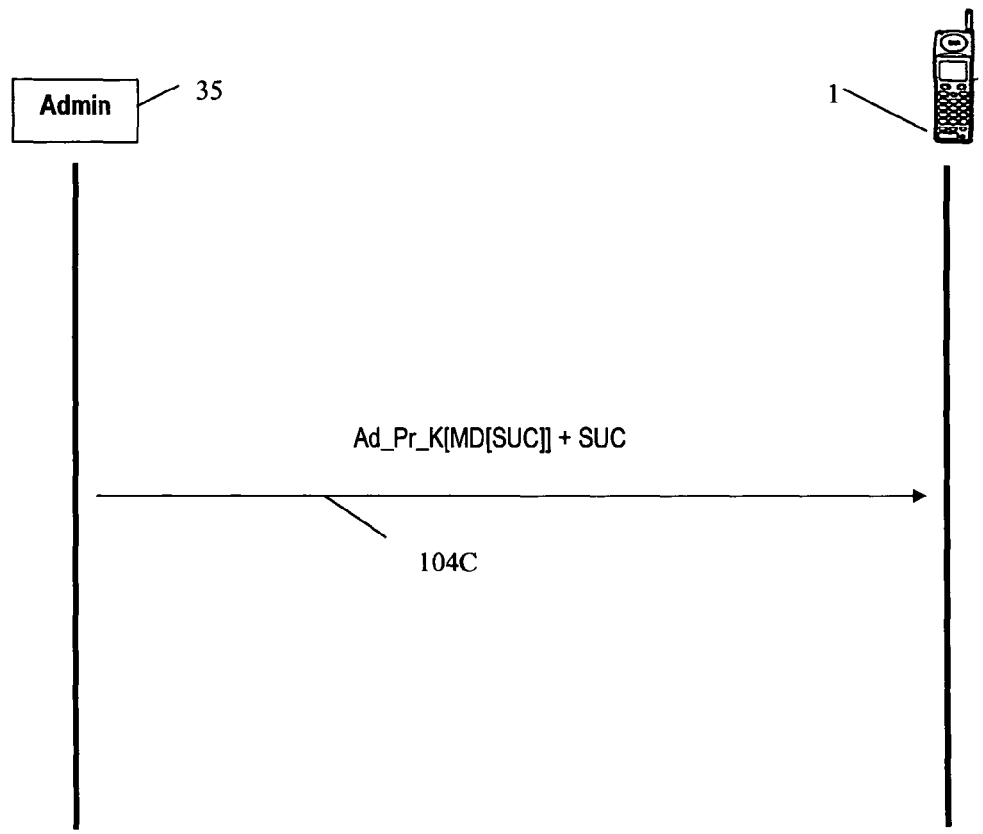

In the second embodiment the procedure performed at the mobile terminal 1, shown in the flow charts of FIGS. 9 and 10, is modified from the corresponding procedure of the first embodiment, shown in the flow charts of FIGS. 5 and 6. Step H of the FIG. 5 embodiment is modified (to step HB of the second embodiment) in that the terminal receives the digital signature of the administrator, certificate and encrypted SIM unlock code (message 104B). Steps I to S of FIGS. 9 and 10 of the second embodiment are the same as steps I to S of the first embodiment. Step T is modified (to step TB) in that the mobile terminal applies a hash function to generate a new message digest. Step U remains the same as step U of the first embodiment.

A modified step, step VB, is performed when the terminal accepts the authenticity of the SIM unlock code and decrypts the encrypted SIM unlock code (SK[SUC]) using the shared secret key (SK). The mobile terminal 1 will only be able to decrypt the encrypted SIM unlock code using the shared secret key (SK) if that SIM unlock code was encrypted using the shared secret key (SK). Therefore, successful decryption of the SIM unlock code will only occur if that SIM unlock code has originated from, and been encrypted by, the administrator 35—because the shared secret key is only known to the administrator 35 (and terminal 1).

After the SIM unlock code (SUC) is extracted in step VB, step W is performed in the same manner as the first embodiment. Step X is modified (to step XB in the second embodiment) so that the SIM unlock code is supplied to the SIM unlock application and the SIM unlocking operation can be completed.

FIGS. 11 to 14 show a third embodiment of the invention, which is a modification of the second embodiment. In the third embodiment a certificate is not obtained from a certificate authority and the SIM unlock code is not encrypted.

This simplifies the message exchanges occurring to verify the validity of the SIM unlock message because no communications between the administrator 35 and the certificate authority 40, or between the mobile terminal 1 and the certificate authority 40 are required. Because no certificate is obtained from the certificate authority, the message 104C (FIG. 11) transmitted from the administrator 35 to the mobile terminal 1 has the form:

Ad_Pr_K[MD[SUC]]+SUC

Figure 12:
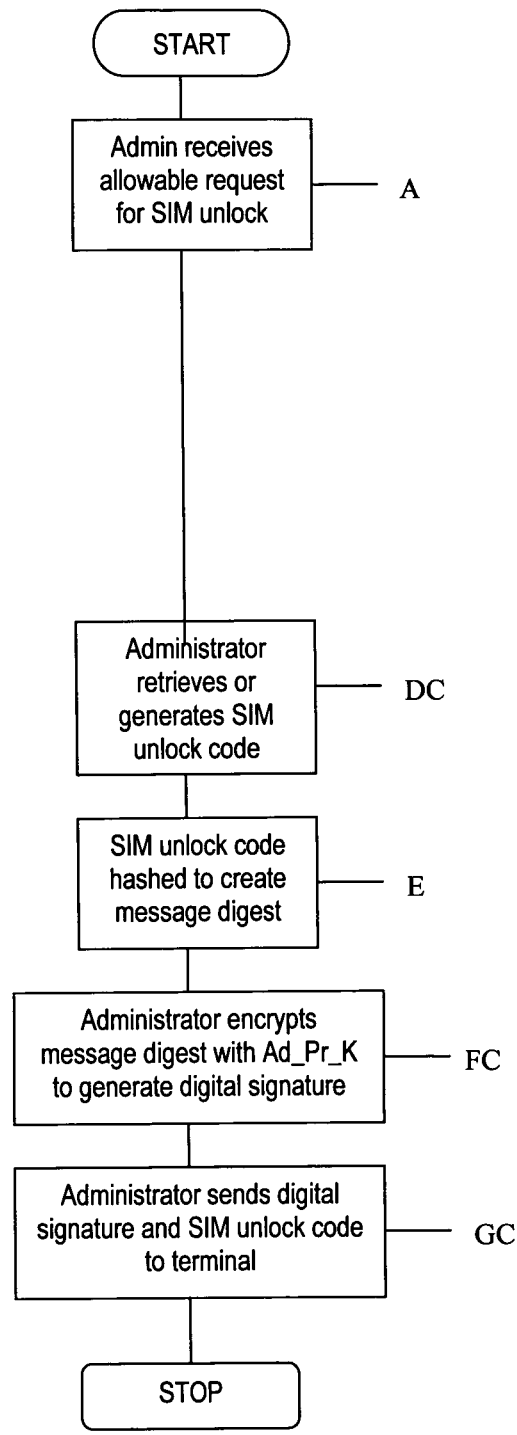

Referring to the flow chart of FIG. 12, which corresponds to the flow chart of FIG. 8 of the second embodiment, step A is performed as before. Steps B and C are not performed. At step DC the administrator retrieves or generates a SIM unlock code. Step E is performed in the same manner as the second embodiment. Step FB (step FC in FIG. 12) is modified in that the SIM unlock code is not encrypted. Step GB (step GC in FIG. 12) is modified in that the administrator 35 sends the digital signature and the SIM unlock code only to the terminal 1 (in message 104C)—that is, no certificate is included.

In the third embodiment the procedure performed at the mobile terminal 1 shown in the flow charts of FIGS. 13 and 14, is modified from the corresponding procedure of the second embodiment, shown in the flow charts of FIGS. 9 and 10. Step HB of the second embodiment is modified (to step HC) of the third embodiment in that the terminal 1 receives the digital signature and SIM unlock code (in message 104C), and not the certificate.

Because no certificate is present, steps I, J, K, L and M are not performed. Therefore, after receipt of the digital signature in SIM unlock code (step HC), step N is performed and the terminal enters the boot mode as in the second embodiment. Steps O to R are omitted because no certificate is present. Steps S to U are then performed in the same manner as the second embodiment. Step VB is modified (to step VC in the third embodiment) because the SIM unlock code is not decrypted. Steps W and XB are then performed in the same manner as the second embodiment.

The third embodiment is less secure than the first embodiment because there is no facility for determining whether the administrator 35 might have been compromised in some way—for example, because its private key has become known. Also, the third embodiment is more susceptible to a "man in the middle" attack because the public key of the administrator (Ad_Pu_K) is not provided by the certificate authority in an encrypted (signed certificate), but must be obtained and stored in the store 37 by some other means.

The first embodiment can also be modified in a similar manner to the third embodiment if no certificate is obtained from a certificate authority. That is to say, SIM unlock instructions (SUI) are sent but no certificate authority is involved.

FIGS. 15 to 17 show a fourth embodiment of the invention, which is a modification to the first embodiment. In this modification, rather than the mobile terminal 1 contacting the certificate authority 40 and a trusted time source 38 to determine whether the certificate is revoked or expired, the certificate authority 40 provides a timestamped proof (TP) of the certificate's validity with the certificate to the administrator 35, and the administrator 35 sends the time stamped proof to the mobile terminal 1 together with the certificate. The timestamped proof is proof that the certificate is valid and includes a timestamp indicating a period for which the timestamped proof is valid, typically 1-2 days.

Steps A and B are performed in the same manner as in the first embodiment. Step C is modified (to step CD in the fourth embodiment) in that the certificate authority 40 sends a timestamped proof (TP) to the administrator 35 together with the certificate, represented in modified step 102D in FIG. 15 as:

Ad_Cert[[Ad_Pu_K,ID]+_CA_Pr_K[CD[Ad_Cert
[Ad_Pu_K,ID]]]]+TP

Steps D, E and F are performed in the same manner as in the first embodiment. Step G is modified (to step GD in FIG. 16) in that the administrator 35 sends the timestamped proof (TP) to the mobile terminal 1 in addition to the digital signature of the administrator, the certificate and the SIM unlock instruction. This is represented at modified step 104D in FIG. 15 as:

Ad_Pr_K[MD[SUI]]+Ad_Cert[[Ad_Pu_K,ID]+SUI+
CA_Pr_K[CD[Ad_Cert[Ad_Pu_K,ID]]]]+TP+
SUI Step H is modified to step HD in that the timestamped proof (TP) is additionally received by the terminal. Step I is modified to step ID in that revocation information is not requested from the CA. At new step JD, the mobile terminal 1 checks whether the timestamped proof is within its term (period) of validity. If not, at new step KD the SIM unlock procedure terminates. If within the term of validity, the mobile terminal 1 accepts the certificate as being valid. Step M is performed in the same manner as the first embodiment. Steps N to X of the fourth embodiment are also performed in the same manner as the first embodiment—reference should be made to FIG. 6 in this regard.

The provision by the certificate authority 40 of a timestamped proof advantageously prevents a need for the certificate authority 40 to have an interface via which mobile terminals can contact the certificate authority to check whether certificates are valid. Such an interface may be expensive to support and secure against, for example, denial of service attacks and flooding. Also, problems of excess traffic at an interface and the delays associated with such traffic are obviated in the fourth embodiment.

Further, any of the embodiments can be modified so that no hashing algorithms are used. No message digests will therefore be generated. Although such a modification simplifies the processing, such an arrangement is less secure because it cannot be determined whether the SIM unlock code (SUC) transmitted by the administrator 35 is the same as the SIM unlock code received by the mobile terminal 1.

In a further modification of any of the embodiments, the digital signature may be verified during the runtime mode. The boot time mode is subsequently entered and digital signature verification is again performed in the boot mode. Such an arrangement is advantageous in that, the boot mode will only be entered if the digital signature is verified initially in the runtime mode. The runtime verification is not as secure as the boot time verification but does provide an indication of whether it is worthwhile to enter the boot mode and perform the verification in the more secure boot mode. In this embodiment steps N to U are additionally performed in the runtime before steps O to U of the first embodiment are performed in the boot mode. Embodiments 2, 3 and 4 can be similarly modified.

In the embodiments described above, the mobile terminal enters runtime mode at step W and the terminal supplies the SIM unlock code or instruction to the SIM unlock application. An important modification to these embodiments is to supply the SIM unlock code or instruction to the SIM unlock application during boot-time and to subsequently enter runtime. There is then no need to run the SIM unlock application during runtime.

The third embodiment might be modified in that a digest of the administrator's public key is pre-stored in the ROM of the mobile terminal. The administrator's public key can therefore be authenticated as belonging to the administrator 35 by applying a hashing function to the administrator's public key to generate a digest and comparing the digest with the stored digest.

In the embodiments described above, a digital signature is equated with "the encryption of a message digest with a private key". However, this is not always the case. In fact, it is only true for RSA encryption schemes. Therefore, it should be understood that the SIM unlock instructions (SUIs) are signed using the administrator's private key to produce a signature (not necessarily an encrypted digest), and then the terminal verifies the signature of the SUI using the administrator's public key (the verification algorithm takes as input the message (SUI), the signature and the public key and produces a success/failure response indicating whether the signature is valid for that public key and message or not).

The invention claimed is:

1. A method of verifying validity of a message received by a telecommunications terminal which is operable in a boot mode and a runtime mode, the message including a signature and a content, the method comprising:
   in response to reception of the message by the terminal when the terminal is operating in the runtime mode, upon the terminal subsequently terminating operation in the runtime mode and entering operation in the boot mode, verifying validity of the signature of the message to extract the content of the message by the terminal while the terminal is operating in the boot mode; and
   verifying validity of the content extracted from the message to verify validity of the message by the terminal while the terminal is operating in the boot mode,
   wherein the message includes an instruction for modifying functionality of the terminal, and
   wherein the terminal is a mobile or cellular telecommunications terminal including an authentication component for authenticating the terminal with a mobile or cellular telecommunications network.

2. The method of claim 1, wherein the signature is a digital signature, and wherein verifying the validity of the signature comprises:
   decrypting the digital signature; and
   upon determining that the digital signature was encrypted by a valid entity, extracting the content of the message.

3. The method of claim 2, wherein, in the boot mode, a key is accessed to verify the validity of the content extracted from the message.

4. The method of claim 3, wherein the key is accessed from a predetermined store of the terminal specified in boot code for performing a boot stage.

5. The method of claim 2, wherein, in the boot mode, a hash or message digest corresponding to the message is calculated.

6. The method of claim 5, wherein boot code for performing a boot stage includes instructions for calculating the hash or message digest.

7. The method of claim 1, wherein the authentication component is a subscriber identity module for authenticating the terminal with the mobile or cellular telecommunications network.

8. The method of claim 7, wherein the mobile terminal is configurable to only be operable with a subscriber identity module associated with the network.

9. The method of claim 8, wherein the instruction included within the message is for causing the terminal to be reconfigured so that it is operable with subscriber identity modules associated with other networks.

10. The method of claim 1, wherein the message includes a certificate and the telecommunications terminal checks validity of the certificate while the terminal is operating in the runtime mode.

11. The method of claim 10, wherein the runtime validity check is performed prior to causing the telecommunications terminal to enter the boot mode.

12. A message verification system, comprising:
   a network administrator generating a message that includes a signature and a content;
   a telecommunications terminal which is operable in a boot mode and a runtime mode and for receiving the message, the terminal being operable to, in response to reception of the message by the terminal when the terminal is operating in the runtime mode, upon the terminal subsequently terminating operation in the runtime mode and entering operation in the boot mode, verify validity of the signature of the message to extract the content of the message while the terminal is operating in the boot mode and verify validity of the content extracted from the message to verify validity of the message while the terminal is operating in the boot mode,
   wherein the message includes an instruction for modifying functionality of the terminal, and
   wherein the terminal is a mobile or cellular telecommunications terminal including an authentication component for authenticating the terminal with a mobile or cellular telecommunications network.

13. The system of claim 12 adapted to perform a method of verifying the validity of the message received by the telecommunications terminal, the method including, in response to reception of the message when the terminal is in the runtime mode, upon the terminal subsequently terminating operation in the runtime mode and entering operation in boot mode, verifying validity of a signature of the message to extract a content of the message while the terminal is operating in the boot mode and verifying validity of the content extracted from the message to verify the validity of the message during the boot mode.

14. A telecommunications terminal which is operable in a boot mode and a runtime mode, the terminal comprising:
   a transceiver receiving a message that includes a signature and a message, and
   a message processor operable to, in response to reception of the message when the terminal is operating in the runtime mode, upon the terminal subsequently terminating operation in the runtime mode and entering operation in the boot mode, verify validity of the signature of the message to extract the content of the message while the terminal is operating in the boot mode and verify validity of the content extracted from the message to verify validity of the message while the terminal is operating in the boot mode,
   wherein the message includes an instruction for modifying functionality of the terminal, and
   wherein the terminal is a mobile or cellular telecommunications terminal including an authentication component for authenticating the terminal with a mobile or cellular telecommunications network.

15. The terminal of claim 14 adapted to perform a method of verifying the validity of the message received by the telecommunications terminal, the method including, in response to reception of the message when the terminal is in the runtime mode, upon the terminal subsequently terminating operation in the runtime mode and entering operation in the boot mode, verifying validity of the signature of the message to extract the content of the message while the terminal is operating in the boot mode and verifying validity of the content extracted from the message to verify the validity of the message during the boot mode.

* * * * *